United States Patent [19]
Susuki et al.

[11] 3,908,055
[45] Sept. 23, 1975

[54] LUMINESCENT COLOR DEVELOPING PLATE

[75] Inventors: Rinnosuke Susuki, Tokyo; Hiroshi Hoshi, Narashino; Kaoru Umeya, Sendai, all of Japan

[73] Assignee: Lion Fat & Oil Co., Ltd., Tokyo, Japan

[22] Filed: Dec. 19, 1973

[21] Appl. No.: 426,217

Related U.S. Application Data
[62] Division of Ser. No. 178,550, Sept. 8, 1971, abandoned.

[30] Foreign Application Priority Data
Sept. 22, 1970 Japan................................ 45-83582

[52] U.S. Cl. .................. 428/67; 428/411; 428/461; 404/9; 404/12; 404/47
[51] Int. Cl.² ............................................. E01F 9/08
[58] Field of Search .......... 40/125 N, 135; 350/104; 252/301.3 R, 301.2; 161/4, 5, 6, 247, 182, 410; 404/47, 68, 9, 12, 13, 16, 14; 260/42.24

[56] References Cited
UNITED STATES PATENTS

| | | |
|---|---|---|
| 868,779 | 10/1907 | Hammer ...................... 252/301.3 R |
| 2,184,492 | 12/1939 | French................................ 404/14 |
| 3,030,870 | 4/1962 | Gill ................................ 252/301.3 |
| 3,112,681 | 12/1963 | Gessler et al. ................... 260/42.49 |
| 3,230,178 | 1/1966 | Bennahmias...................... 252/301.3 |
| 3,291,668 | 12/1966 | Goldstein........................... 161/165 |
| 3,475,248 | 10/1969 | Brasure............................. 161/410 |

FOREIGN PATENTS OR APPLICATIONS
993,167   10/1951   France............................ 252/301.3

OTHER PUBLICATIONS
"Road Markings," pp. 254, 255, Public Roads, Dec. 1969.

*Primary Examiner*—George F. Lesmes
*Assistant Examiner*—R. J. Roche
*Attorney, Agent, or Firm*—Cushman, Darby & Cushman

[57] ABSTRACT

This invention is intended to provide a luminescent color developing plate to be obtained by molding a synthetic resin incorporated with such luminous substances as fluorescent substance or phosphorescent substance together with a pigment or dye, or by laminating synthetic resin sheets with an adhesive incorporated with the above-mentioned luminous substance and pigment or dye.

4 Claims, 4 Drawing Figures

US Patent Sept. 23,1975 3,908,055

LUMINESCENT COLOR DEVELOPING PLATE

This is a division of application Ser. No. 178,550, filed Sept. 8, 1971, now abandoned.

BACKGROUND OF THE INVENTION

1. Field of the Invention

This invention relates to a luminescent color developing plate to be obtained by incorporating a pigment or dye together with a luminous substance into a synthetic resin while molding process or by laminating synthetic resin sheets with an adhesive incorporated with a pigment or dye together with a luminous substance, having easy-to-recognize luminous colors and suitable for a name plate on the gate, embedded road signs, and the like.

2. Description of the Prior Art

A luminescent color developing plate of this kind has been produced by applying a color paint containing a fluorescent or phosphorescent substance onto the surface of a plate, or by mounting a metal plate coated with the above-mentioned color paint by means of fitting or riveting. Usually, it lacks durability and is abraded by pedestrians and cars passing on it in case it is used as embedded road signs for the centerline. Thus, the luminous substance and dye or pigment are lost and the ease of recognition, for which the luminous substance has been applied, is gradually lost.

SUMMARY OF THE INVENTION

This invention was made to eliminate the above-mentioned disadvantages of the prior art, and the object of this invention is to provide a color developing plate manufactured by molding a thermoplastic resin or a thermosetting resin incorporated with such a luminous substance as a fluorescent substance or a phosphorescent substance together with a pigment or dye, or by laminating synthetic resin sheets with an adhesive incorporated with the above-mentioned luminous substance and pigment or dye, said color developing plate being used as tiles in the toilet and embedded road signs because the color developing property and luminous action last long even after the plate has been abraded.

DESCRIPTION OF THE PREFERRED EMBODIMENT

Figure 1:
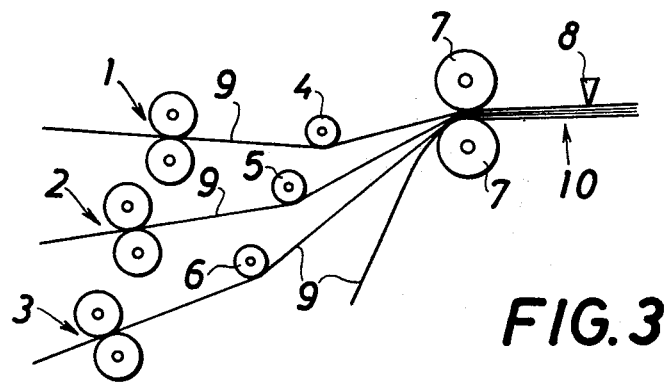
FIG. 1 is an explanatory view showing schematically an example of molding equipment for a color developing plate according to the invention.

To illustrate a preferred embodiment of this invention, reference will now be made to the drawings. Referring to FIG. 1, there is shown a group of paired calendar rolls 1, 2, and 3, adhesive applying rolls 4, 5, and 6, a pressing roll 7, and a cutter 8 whereby a laminate 10 of sheets 9 is cut to a length. The adhesive to be applied to the sheets 9 by the adhesive applying roll should be incorporated with a fluorescent substance or a phosphorescent substance together with a pigment or dye. The luminous substance to be used actually is a well-known one consisting of oxide, sulfide, silicate, or phosphate of Ca, Ba, Mg, Zn, and Cd as a principal ingredient and 1–0.01 wt% of Mn, Ag, Cu, Sb, or Pb as an activator. The laminate 10 manufactured as mentioned above is held between supporting plates 11 made of ordinary plastics molding, metal, or concrete so as to complete a luminous color developing plate 12. Luminescent action is performed by luminous substance in each bonding face of the sheets. The laminate may be prepared by bonding with an adhesive 14 luminous color developing sheets 15 incorporated with the above-mentioned luminous substance.

Figure 2:
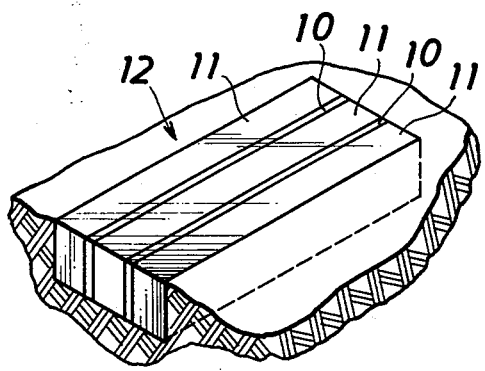
FIG. 2 and FIG. 3 are perspective views showing molded color developing plates in use as road signs.
Figure 3:
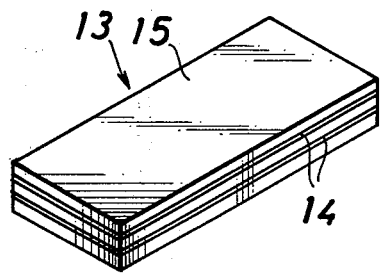
Figure 4:
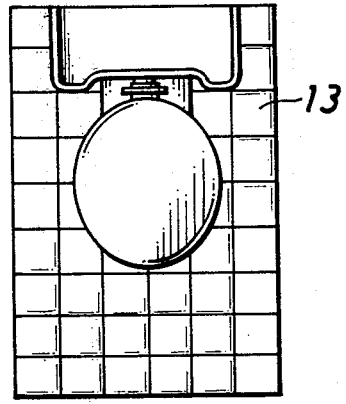
FIG. 4 is a top plan view of color developing plates in use as tiles in the toilet.

It is not necessarily required to place the color developing plate 13 with the cut end up as shown in FIG. 2; the surface of the sheet may be exposed for use as shown in FIG. 3. The color developing plate incorporated with a luminous substance may be cut into small plates and applied as tiles in the toilet or porch or used as ceiling boards and a wall finishing material as shown in FIG. 4. Extremely effective luminous action is performed by the luminous substance incorporated.

The luminous action of the plate used as road signs does not become weak even after abrasion by cars passing on it, because a a new surface or new luminous substance comes out as the surface is abraded.

The above-mentioned sheet is made most preferably of a resin composite consisting of such a thermoplastic resin as polyethylene, polypropylene, polyvinyl chloride, and the like or copolymer thereof or a mixture of the thermoplastic resin and copolymer thereof, and 1–95 wt%, preferably 10–90 wt%, of either or both of calcium sulfate and gypsum as a filler. The synthetic resin to be used is not limited to thermoplastic resins, but such a thermosetting resin as phenolic resin, urea resin, melamine resin, and the like may be used. Also, the filler is not limited to the above-mentioned, but other inorganic fillers such as titanium oxide, zinc oxide, lime, carbon black, and the like may be used. Incorporation of the inorganic filler in large quantities does not deteriorate the strength and moldability of a thermoplastic resin. The particle size of the inorganic filler is not specifically limited, but the optimum size is below 500 micron.

The resilience and impact strength of the material is improved by incorporating a proper amount of copolymer of thermoplastic resin, e.g., ethylene-vinylacetate copolymer (EVA), and the resulting luminous color developing plate is improved in the mechanical strength.

The examples of preferred embodiments of this invention are given below.

EXAMPLE 1

| | |
|---|---|
| High density polyethylene | 35 wt% |
| Calcium sulfite | 55 wt% |
| Fluorescent pigment (CdS) | 10 wt% |

The above composite material was mixed in a Banbury mixer and then rolled into a sheet of required thickness. This sheet was bonded together with an ordinary adhesive or welded by heat to form a luminous color developing plate that assumes a yellow color.

EXAMPLE 2

| | |
|---|---|
| High density polyethylene | 20 wt% |
| Calcium sulfite | 40 wt% |
| Gypsum ($CaSO_4 \cdot 2H_2O$) | 40 wt% |

The above composite was formed into a sheet of required thickness in the same manner as in Example 1, and this sheet was bonded together with an adhesive having the following composition.

| | |
|---|---|
| EVA | 30 wt% |
| Rosin derivative | 50 % |
| Paraffin wax | 10 % |
| Polybutene | 5% |
| Fluorescent pigment (CdS) | 1 % |

EXAMPLE 3

| | |
|---|---|
| High density polyethylene | 30 wt% |
| Calcium sulfite | 65 wt% |
| Eosine | 5 wt% |

The above composite material was formed into a 5-mm thick plate, and the plate was bonded together with rosin-type adhesive. This luminous color developing plate fluoresces a green color.

As described in the foregoing, the luminous color developing plate manufactured according to this invention contains a luminous substance in the resin material or adhesive bonding resin sheets. Consequently, when used as road signs for the safety zone and centerline, the luminous color developing plate exhibits extremely effective luminescent and color developing actions. Further, the luminous color developing plate is light in weight and tough and is obtained at a low cost by mass production with ease. The inorganic filler incorporated into the synthetic resin imparts stiffness and stability to the sheet and has an effect as an extender with a costwise advantage. Also, it makes the synthetic resin suitable for a broad range of applications.

What is claimed is:

1. A luminous color reflecting laminated plate embedded into and substantially in the plane of a road surface, said plate consisting of colored layers composed of: (1) from about 20 to about 35 percent by weight of a synthetic resin selected from the group consisting of high density polyethylene, polypropylene and polyvinyl chloride, (ii) from about 1 to about 10 percent by weight of a coloring amount of a luminous color-reflecting fluorescent or phosphorescent substance selected from the group consisting of calcium sulfide, zinc sulfide, cadmium sulfide and eosine in combination with a pigment or dye, and (iii) from about 55 to about 95 percent by weight of an inorganic filler selected from the group consisting of calcium sulfite, calcium sulfate, and their mixture, the sum of components (i)–(iii) amounting to 100 percent, components (ii) and (iii) thoroughly mixed and incorporated in said resin component (i), said colored layers being supported by at least one non-luminescent spacing layer.

2. The luminous color reflecting laminated plate according to claim 1 wherein from about 0.01 to 1 percent by weight of manganese, silver, copper, tin or lead is present as an activator in said reflecting synthetic resin laminate.

3. The luminous color reflecting plate according to claim 6 wherein a plurality of said colored layers are arranged between alternating layers of said non-luminous spacing material.

4. The luminous color reflecting plate according to claim 6 wherein a plurality of said colored layers are bonded together with an adhesive.

* * * * *